United States Patent
Kim et al.

(10) Patent No.: US 8,224,318 B2
(45) Date of Patent: Jul. 17, 2012

(54) LOCATION SERVICE PROVIDING SYSTEM AND METHOD

(75) Inventors: Joo-Young Kim, Suwon-si (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 545 days.

(21) Appl. No.: 11/545,663

(22) Filed: Oct. 10, 2006

(65) Prior Publication Data

US 2007/0082682 A1  Apr. 12, 2007

(30) Foreign Application Priority Data

Oct. 10, 2005 (KR) .................. 10-2005-0095174

(51) Int. Cl.
*H04W 24/00* (2009.01)
(52) U.S. Cl. ........................ 455/433; 455/456
(58) Field of Classification Search ............... 455/404.2, 455/456.1; 701/207, 213; 342/357.8
See application file for complete search history.

(56) References Cited

U.S. PATENT DOCUMENTS

| 6,830,213 B1 * | 12/2004 | Gehlot et al. .............. 244/3.19 |
| 2002/0019698 A1 * | 2/2002 | Vilppula et al. ............. 701/207 |
| 2004/0127229 A1 * | 7/2004 | Ishii ..................... 455/456.1 |
| 2004/0185870 A1 | 9/2004 | Matsuda |
| 2005/0250516 A1 * | 11/2005 | Shim ..................... 455/456.1 |
| 2006/0225090 A1 * | 10/2006 | Shim et al. .................. 725/25 |
| 2007/0037585 A1 * | 2/2007 | Shim ..................... 455/456.1 |

FOREIGN PATENT DOCUMENTS

| WO | WO 2004071127 A2 * | 8/2004 |
| WO | WO 2005079002 A1 * | 8/2005 |

* cited by examiner

*Primary Examiner* — George Eng
*Assistant Examiner* — Nizar Sivji
(74) *Attorney, Agent, or Firm* — The Farrell Law Firm, P.C.

(57) ABSTRACT

A location service providing system and method the system includes target SUPL (Secure User Plane for Location) Enabled Terminal (SET) determines and stores a positioning method in an initialization stage of a location service according to a triggered location service request, determines in a location calculation process whether the stored positioning method is available, provides the stored positioning method if it is determined that the stored positioning method is available, and requests for re-determination of a positioning method if it is determined that the stored positioning method is unavailable: and a home-SUPL location platform (H-SLP) which provides the location service using the stored positioning method if the stored positioning method is provided from the target SET or provides the location service by re-determining a positioning method with the target SET if the re-determination of a positioning method is requested.

27 Claims, 7 Drawing Sheets

LOCATION SERVICE PROVIDING SYSTEM AND METHOD

PRIORITY

This application claims priority under 35 U.S.C. §119 to an application entitled "Location Service Providing System and Method" filed in the Korean Intellectual Property Office on Oct. 10, 2005 and assigned Serial No. 2005-95174, the contents of which are incorporated herein by reference.

BACKGROUND OF THE INVENTION

1. Field of the Invention

The present invention relates generally to a location service providing system and method, and in particular, to a location service providing system and method for repeatedly providing a location service.

2. Description of the Related Art

Recently, according to an increase in demands for location-related services, various location services using a position of a mobile communication terminal are being provided and/or developed.

In particular, a triggered location service for repeatedly providing a location service in response to a single request has been being developed. The triggered location service includes a service for periodically or non-periodically providing a location service corresponding to a specific time and condition.

In the triggered location service, a home-SUPL (Secure User Plane for Location) location platform (H-SLP) and a target SUPL enabled terminal (SET) determine a positioning method to be used to calculate a position of the target SET when they are initially connected. That is, when the H-SLP and the target SET are initially connected to each other, the H-SLP and the target SET exchange their positioning capabilities, and the H-SLP or the target SET selects a common positioning capability and determines the selected positioning capability as the positioning method. The H-SLP and the target SET store the determined positioning method in their memories and reuse the stored positioning method in an assistant data calculation process required for the triggered position service.

The H-SLP receives requests of the triggered position service from a plurality of target SETs. Thus, the H-SLP can store positioning methods of the plurality of target SETs in its memory, and when the H-SLP calculates a position of each of the plurality of target SETs, the H-SLP can search for a positioning method of a target SET from among the stored positioning methods of the plurality of target SETs. However, it is inefficient for the H-SLP to store these positioning methods and reuse one of them in a location calculation process.

In addition, in the triggered location service, the H-SLP determines and stores a positioning method when it is initially connected to a target SET, continuously uses the stored positioning method, and deletes the stored positioning method when the triggered location service ends. However, since positioning methods use variable data, an error may occur in a process of storing or deleting each of the positioning methods in (or from) the memory of the H-SLP.

As a result, since the H-SLP repeatedly (periodically or non-periodically) performs the location calculation process for the triggered location service with a plurality of target SETs, a process of storing and searching a variable positioning method of each of the plurality of target SETs may burden the H-SLP with repetitive processes. Moreover, since the process of storing and searching a variable positioning method of each of the plurality of target SETs is frequently performed, an error occurrence probability is high.

SUMMARY OF THE INVENTION

An object of the present invention is to substantially solve at least the above problems and/or disadvantages and to provide at least the advantages below. Accordingly, an object of the present invention is to provide a location service providing system and method, whereby each target SET stores its own positioning method in order to reduce the load of an H-SLP when positioning methods determined in an initialization stage of a triggered location service are stored and used.

Another object of the present invention is to provide a location service providing system and method, whereby loss of variable data of a positioning method can be prevented by storing each positioning method in each corresponding target SET in a triggered location service.

According to one aspect of the present invention, there is provided a location service providing system including a target SUPL (Secure User Plane for Location) Enabled Terminal (SET) for determining and storing a positioning method in an initialization stage of a location service according to a location service request, determining in a location calculation process whether the stored positioning method is available, providing the stored positioning method if it is determined that the stored positioning method is available, and requesting re-determination of a positioning method if it is determined that the stored positioning method is unavailable; and a home-SUPL location platform (H-SLP) for providing the location service using the stored positioning method if the stored positioning method is provided from the target SET, and providing the location service by re-determining a positioning method with the target SET if the re-determination of positioning method is requested.

According to another aspect of the present invention, there is provided a location service providing method including determining and storing, by a target SET, a positioning method in an initialization stage of a location service according to a location service request, determining in a location calculation process whether the stored positioning method is available, providing the stored positioning method if it is determined that the stored positioning method is available, and requesting for re-determination of a positioning method if it is determined that the stored positioning method is unavailable; and providing, by a home-SUPL (Secure User Plane for Location) location platform (H-SLP), the location service using the stored positioning method if the stored positioning method is provided from the target SET, providing the location service by re-determining a positioning method with the target SET if the re-determination of the positioning method is requested.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
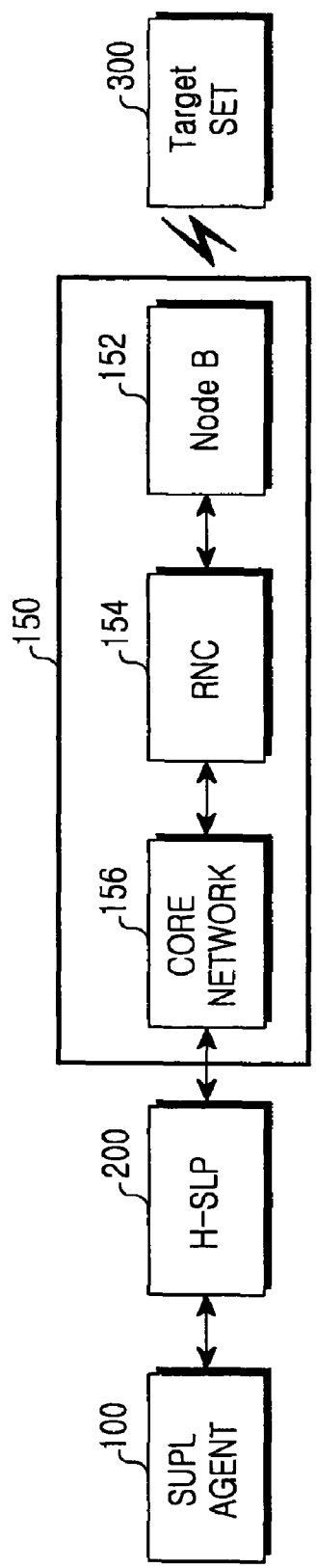
FIG. 1 is a block diagram of a location service providing system according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

FIG. 1 is a block diagram of a location service providing system according to the present invention. Referring to FIG. 1, the location service providing system includes a Secure User Plane for Location (SUPL) agent 100, a home-SUPL location platform (H-SLP) 200, a target SET 300, and a mobile communication terminal 150.

The SUPL agent 100 is an entity, which can use an SUPL protocol, and a service access pointer, which is connected to the H-SLP 200 supporting SUPL, to request a location service. The SUPL agent 100 can request various location services. For example, the SUPL agent 100 can request an immediate location service, a triggered location service, an emergency location service, a lawful location service (i.e., a location service for law enforcement agencies), and other applicable location services. A periodic event service is a service for providing a time-based location service. An area event service is a service for providing an area-based location service. For example, the area event service provides a position of a target SET in a range of a certain area (e.g., a building or a zone).

When a location service is requested, the SUPL agent 100 notifies the H-SLP 200 of which service is requested using a service-flag indicating a location service type.

The service-flag indicating which service is requested can be formed as illustrated in Table 1.

TABLE 1

| Service type | Value of service-flag | |
|---|---|---|
| Immediate location service | 11 | |
| Triggered location service | Periodic | 21 |
| | Area event | 22 |
| | Other events | 23-29 |
| Emergency location service | 31 | |
| Lawful location service | 41 | |
| Reserved value | 101~ | |

As illustrated in Table 1, the service-flag value in the immediate location service can be 11. The service-flag value in the triggered location service can differ according to a type of the triggered location service, i.e., 21 for the periodic triggered location service, 22 for the area event triggered location service, and 23-29 for the other event triggered location services, for example SET (SUPL Enabled Terminal) being "off" becomes "on". The service-flag value in the emergency location service can be 31, and the service-flag value in the lawful location service can be 41. The service-flag value in the other applicable location services can be 101 or more.

When a location service request is received from the SUPL agent 100, the H-SLP 200 detects a type of the requested location service using a service-flag included in a location service request message. The H-SLP 200 may accept or reject the location service request according to a result obtained by searching a service profile corresponding to the requested location service. If the H-SLP 200 accepts the location service request, the H-SLP 200 can perform control over service charges derived by providing the requested location service and notify the target SET 300 whether the requested location service is accepted or rejected.

In response to the location service request of the SUPL agent 100, the H-SLP 200 also performs a location calculation process with the target SET 300, or calculates assistance data and transmits the calculated assistant data to the target SET 300 so that the target SET 300 can calculate its position.

The H-SLP 200 may also determine a positioning method required for the location calculation process and the assistant data calculation with the target SET 300. In this case, the positioning method may be determined by comparing the capability (e.g., available protocols and positioning methods) of the H-SLP 200 and the capability (e.g., available protocols and positioning methods) of the target SET 300. The H-SLP 200 may determine a positioning method when it is initially connected to the target SET 300 and/or initialized. When the positioning method is determined, the H-SLP 200 transmits the determined positioning method to the target SET 300. Thereafter, if the H-SLP 200 performs the location calculation process or the assistant data calculation, the H-SLP 200 receives the determined positioning method from the target SET 300 and uses the received positioning method. If H-SLP 200 cannot receive the determined positioning method from the target SET 300, the H-SLP 200 determines a new positioning method with the target SET 300.

The target SET 300, which is a target of location calculation, performs the location calculation process with the H-SLP 200. In a network initiated case, i.e., in a case where a position (including position information) of the target SET 300 is requested by the SUPL agent 100 which is a third party, the target SET 300 can accept or reject these request. In a SET initiated case, i.e., in a case where the target SET 300 requests its position, the target SET 300 can request its position from the H-SLP 200.

When the triggered location service, such as the periodic triggered location service or the area event triggered location service, is requested, the target SET 300 can store a positioning method determined when the target SET 300 is initially connected to the H-SLP 200.

When the location calculation process or the assistant data calculation process begins, the target SET 300 the H-SLP 200 to reuse the previously determined positioning method by transmitting the stored positioning method to the H-SLP 200 so that a process of determining a positioning method may be omitted.

When an error is generated while the positioning method is stored, or when a new positioning method needs to be determined since the stored positioning method is inappropriate, the target SET 300 requests the H-SLP 200 to determine a new positioning method.

In detail, the target SET 300 requests the H-SLP 200 to determine a new positioning method by changing a value corresponding to a positioning method, which is included in an SUPL POS INIT message that is transmitted to the H-SLP 200, to, for example, 0 or null.

If a value designated to use the previously determined positioning method is included in an SUPL POS INIT message received from the target SET 300, the H-SLP 200 receives the positioning method stored in the target SET 300 and uses the received positioning method. If a value corresponding to a positioning method, which is included in an SUPL POS INIT message received from the target SET 300, is 0 or null, the H-SLP 200 determines a new positioning method by performing the process of determining a positioning method.

When the triggered location service is provided, a trigger can be repeatedly generated by the H-SLP 200 or the target SET 300 in order to notify of the beginning of the location calculation process (location calculation and assistant data calculation) at every predetermined interval time. The H-SLP 200 or the target SET 300 announces using a trigger-flag that it generates the trigger for notifying of the beginning of the location calculation process.

The trigger-flag indicating a trigger generation initiated party can be formed as illustrated in Table 2.

TABLE 2

| Trigger generation initiated party | Value of trigger-flag |
|---|---|
| H-SLP 200 generates a trigger | 0 |
| Target SET 300 generates a trigger | 1 |

Referring to Table 2, if the trigger-flag is set to 0, the H-SLP 200 generates a trigger, and if the trigger-flag is set to 1, the target SET 300 generates a trigger.

In the network initiated case, the H-SLP 200 can set the trigger-flag, which is included in an SUPL INIT message transmitted to the target SET 300, to 0 or 1. If the trigger-flag value included in the SUPL INIT message is 1, the target SET 300 determines that it generates a trigger, and if the trigger-flag value included in the SUPL INIT message is 0, the target SET 300 determines that the H-SLP 200 generates a trigger.

In the SET initiated case, the target SET 300 can set the trigger-flag, which is included in an SUPL INIT message transmitted to the H-SLP 200, to 0 or 1. If the trigger-flag value included in the SUPL NIT message is 1, the target SET 300 determines that the target SET 300 generates a trigger, and if the trigger-flag value included in the SUPL NIT message is 0, the H-SLP 200 determines that the H-SLP 200 generates a trigger.

A method of providing a location service in the location service providing system illustrated in FIG. 1 will now be described in detail. In the following description, the location service providing method is described by illustrating the network initiated case and the SET initiated case. In both cases, it is assumed that the periodic triggered location service is requested, the H-SLP 200 is in a proxy mode in which a management server and an SLP server are integrated, and the target SET 300 is a trigger generation initiated party. Regardless of the assumption, the present invention can be applied to all types of the triggered location service including the periodic triggered location service and the area event location service. In addition, the present invention can be applied to a case where the H-SLP 200 is in a non-proxy mode in which the management server and the SLP server are separated and a case where the H-SLP 200 is the trigger generation initiated party.

In addition, although a case where the target SET 300 is managed by the H-SLP 200 (i.e., a non-roaming case) will be described, the present invention can be applied to a case where the target SET 300 is located in a visited network (i.e., a roaming case).

Figure 2:
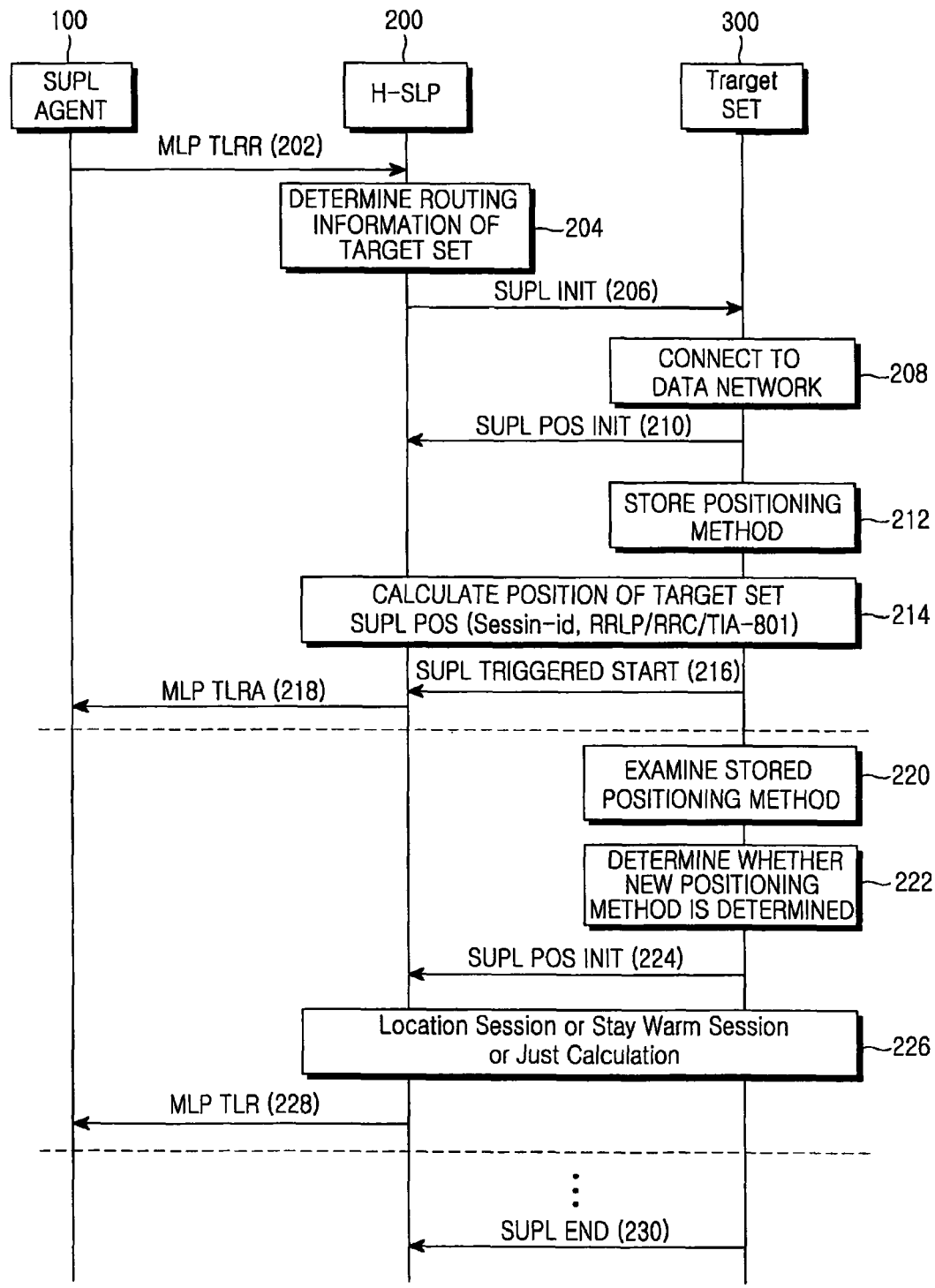
FIG. 2 is a flow diagram illustrating a location service providing method when an SUPL agent requests a location service according to the present invention.

FIG. 2 is a flow diagram illustrating a location service providing method when the SUPL agent 100 of FIG. 1 requests a location service according to the present invention.

Referring to FIG. 2, the SUPL agent 100 requests the periodic triggered location service, from the H-SLP 200 using a mobile location protocol triggered location reporting request (MLP TLRR) message in step 202. In this case, the SUPL agent 100 can request a desired location service using a service-flag included in the MLP TLRR message. That is, the SUPL agent 100 sets the service-flag to a value corresponding to a periodic triggered location service request in order to request the periodic triggered location service and transmits the MLP TLRR message to the H-SLP 200.

When the MLP TLRR message is received from the SUPL agent 100, the H-SLP 200 determines which location service is requested by referring to the service-flag included in the MLP TLRR message and sets up routing information of the target SET 300 in step 204. That is, the H-SLP 200 determines whether the target SET 300 is in a roaming state and whether the target SET 300 uses SUPL and sets up routing information according to the determination result. In the current embodiment, it is assumed that the target SET 300 is in a non-roaming state and uses SUPL.

After the determination, the H-SLP 200 notifies the target SET 300 of the beginning of the periodic triggered location service by transmitting an SUPL INIT message to the target SET 300 in step 206. In this case, the service-flag and a trigger-flag are included in the SUPL INIT message. The service-flag indicates which type of location service was requested by the SUPL agent 100, and the trigger-flag indicates whether a trigger for beginning the location calculation process or the assistant data calculation process is generated by the H-SLP 200 or the target SET 300. In the present invention, since it is assumed that the periodic triggered location service is requested, a value of the service-flag is 20 according to Table 1, and since it is assumed that a trigger is generated by the target SET 300, a value of the trigger-flag is 1 according to Table 2.

When the SUPL INIT message is received, the target SET 300 attempts a data network connection in step 208. That is, the target SET 300 checks that it is connected to a packet data network, and if the target SET 300 is not connected to the packet data network, the target SET 300 tries a connection to the packet data network. In this case, the target SET 300 determines the proxy mode or the non-proxy mode by referring to a SLP_MODE parameter included in the received SUPL INIT message. In the proxy mode, the target SET 300 is connected to the H-SLP 200 using Internet protocol (IP).

After connected to the H-SLP 200 using IP, the target SET 300 transmits an SUPL POS INIT message to the H-SLP 200 in step 210. The SUPL POS INIT message includes a SET_CAPABILITY field. The SET_CAPABILITY field indicates which one of a mobile station (MS)-assisted assisted global positioning system (A-GPS) method and an MS-BASED A-GPS method is used as a positioning method and which one of a radio resource location services protocol (RRLP), a radio resource control (RRC) protocol, and an IS-801 protocol is used as a positioning protocol.

If the SUPL POS INIT message is received from the target SET 300, the H-SLP 200 compares a value of the SET_CAPABILITY field to its own positioning capability and determines a positioning method used to the location calculation process according to the comparison result. The H-SLP 200 transmits the determined positioning method to the target SET 300.

The target SET 300 stores the positioning method in step 212. The target SET 300 and the H-SLP 200 calculate a position of the target SET 300 (SUPL POS) in step 214 using the positioning method stored in the target SET 300.

The target SET 300 transmits an SUPL TRIGGERED START message including a position thereof and information for notifying of the beginning of the periodic triggered location service to the H-SLP 200 in step 216. The H-SLP 200 notifies the SUPL agent 100 of the beginning of the periodic triggered location service by transmitting an MLP triggered location reporting answer (TLRA) message to the SUPL agent 100 in step 218.

The target SET 300 repeatedly checks a trigger generation time according to a trigger generation period included in the received SUPL INIT message. If it is the trigger generation time as the trigger generation period checking result, the target SET 300 generates a trigger to start the location calculation process or the assistant data calculation process.

To generate the trigger, the target SET 300 examines in step 220 whether a positioning method determined and stored at an initially connected time exists. The target SET 300 determines in step 222 whether a positioning method is re-determined. That is, the target SET 300 determines whether the stored positioning method is used or a new positioning method is to be determined. If an error was generated while the stored positioning method was being stored, or if the stored positioning method is inappropriate, the target SET 300 determines that a new positioning method is to be determined (i.e., re-determined).

If it is determined that a new positioning method is determined, the target SET 300 sets a value of a positioning method (posmethod) included in an SUPL POS INIT message to 0 or null and transmits the SUPL POS INIT message to the H-SLP 200 in step 224.

If the value of the positioning method field (posmethod) included in the SUPL POS INIT message received from the target SET 300 is neither 0 nor null, the H-SLP 200 uses a positioning method received from the target SET 300. If the value of the positioning method field (posmethod) included in the SUPL POS INIT message received from the target SET 300 is 0 or null, the H-SLP 200 re-determines a positioning method.

After a positioning method is determined, the H-SLP 200 and the target SET 300 calculate a position of the target SET 300 by performing a location session process, a stay warm session process, or a just calculation process in step 226. The location session process is a process for the H-SLP 200 to create assistant data and calculate the position of the target SET 300. The stay warm session process is a process in which the H-SLP 200 creates assistant data and transmits the created assistant data to the target SET 300 and the target SET 300 calculates a position thereof and transmits the calculated position to the H-SLP 200. The just calculation process is a process in which the target SET 300 checks whether valid assistant data exists and, if valid assistant data exists, calculates a position thereof and transmits the calculated position to the H-SLP 200.

After a position of the target SET 300 is calculated, the H-SLP 200 transmits the calculated position of the target SET 300 to the SUPL agent 100 using an MLP TLR message in step 228.

The target SET 300 repeatedly checks the trigger generation time according to the trigger generation period included in the SUPL INIT message and, steps 220 to 228 are iteratively performed until a predetermined stop time has elapsed. If the predetermined stop time has elapsed, the target SET 300 notifies the H-SLP 200 that the periodic triggered location service has ended by transmitting an SUPL END message to the H-SLP 200 in step 230. Accordingly, resources used for the periodic triggered location service and all prepared resources are released, and the periodic triggered location service is ended.

Though a case where the H-SLP 200 does not use a previous position of the target SET 300 has been described, the H-SLP 200 may reuse the previous position of the target SET 300. In this case, steps 220 to 228 illustrated in FIG. 2 are omitted, and the previous position of the target SET 300 is directly transmitted to the SUPL agent 100.

In detail, if the previous position of the target SET 300 is reused, the H-SLP 200 determines whether the previous position of the target SET 300 is stored in a memory thereof. If the previous position of the target SET 300 is stored in the memory, the H-SLP 200 determines whether Quality of Position (QoP) of the previous position of the target SET 300 is appropriate to (i.e., is equal to or greater than) a level of QoP required by the SUPL agent 100. If it is determined that the QoP of the previous position of the target SET 300 is appropriate, the H-SLP 200 directly transmits an MLP TLRA message including the previous position of the target SET 300 to the SUPL agent 100 without notifying the target SET 300 of a location service request. If notification on the location service request is unnecessary, or in a case such as the emergency location service or the lawful location service, the H-SLP 200 may directly transmit an MLP TLRA message including the previous position of the target SET 300 to the SUPL agent 100 without notifying the target SET 300 of a location service request.

The target SET 300 also can have a previous position stored therein or receive a previous position from the H-SLP 200 through the SUPL INIT message. Thus, the target SET 300 examines whether a previous position is included in the received SUPL INIT message and whether a previous position is stored therein. If a previous position exists, the target SET 300 determines whether the previous position is reused. That is, the target SET 300 compares QoP of the previous position to QoP required by the SUPL agent 100, and if the QoP of the previous position is higher than the QoP required by the SUPL agent 100, the target SET 300 accepts that the previous position is reused. If the target SET 300 simultaneously has the previous position stored therein and the previous position received from the H-SLP 200, the target SET 300 selects a previous position having higher QoP by comparing the previous position stored therein to the previous position received from the H-SLP 200 and compares QoP of the selected previous position to the QoP required by the SUPL agent 100, if the QoP of the selected previous position is higher than the QoP required by the SUPL agent 100, the target SET 300 accepts that the selected previous position is reused. If the reuse of the previous position is accepted, the target SET 300 transmits the previous position to the H-SLP 200, and the H-SLP 200 transmits the received previous position to the SUPL agent 100.

The location service providing method corresponding to the case where the SUPL agent 100 requests a location service according to the present invention is illustrated in Table 3.

TABLE 3

A case where SUPL agent requests a location service (network initiated case)

| | | |
|---|---|---|
| SET assisted case | Location session | H-SLP performs location calculation and calculates assistant data. |
| SET based case | Stay warm session | H-SLP calculates assistant data, and target SET receives calculated assistant data, calculates its position, and reports calculated position to H-SLP. |
| — | Just calculation | Target SET has valid assistant data, calculates its position using valid assistant data, and reports calculated position to H-SLP. |
| — | SUPL report (use a previous position) | Target SET has previous position, and if QoP of previous position is appropriate to level required by SUPL agent, target SET directly transmits previous position to H-SLP. |

The location session process, the stay warm session process, the just calculation process, and the SUPL report process (use a previous position) of the case where the SUPL agent 100 requests a location service, i.e., the network initiated case, which are illustrated in Table 3, will now be described in detail.

Figure 3:
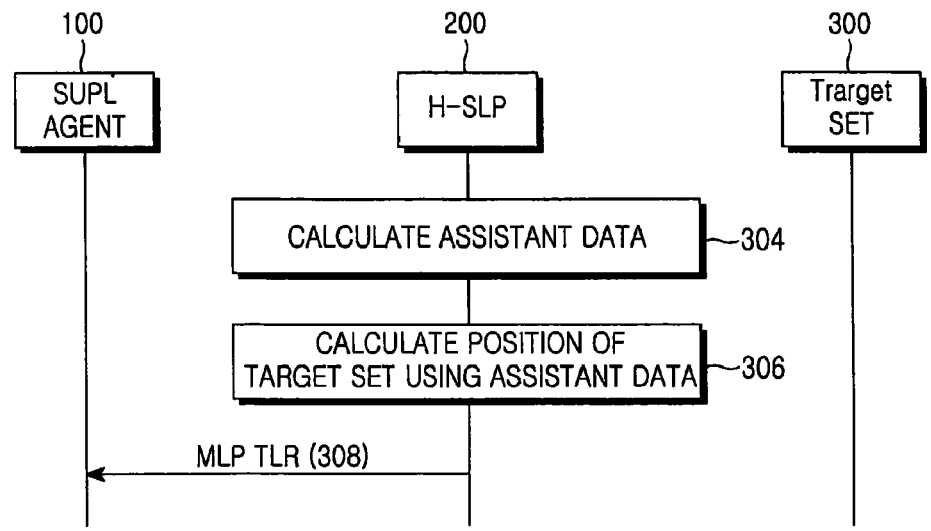
FIG. 3 is a flow diagram illustrating a location session process when the SUPL agent requests a location service according to the present invention.

FIG. 3 is a flow diagram illustrating the location session process when the SUPL agent 100 requests a location service according to the present invention. Referring to FIG. 3, the H-SLP 200 calculates assistant data in step 304, calculates a position of the target SET 300 using the calculated assistant data in step 306, and transmits an MLP TLR message including the calculated position of the target SET 300 to the SUPL agent 100 in step 308.

Figure 4:
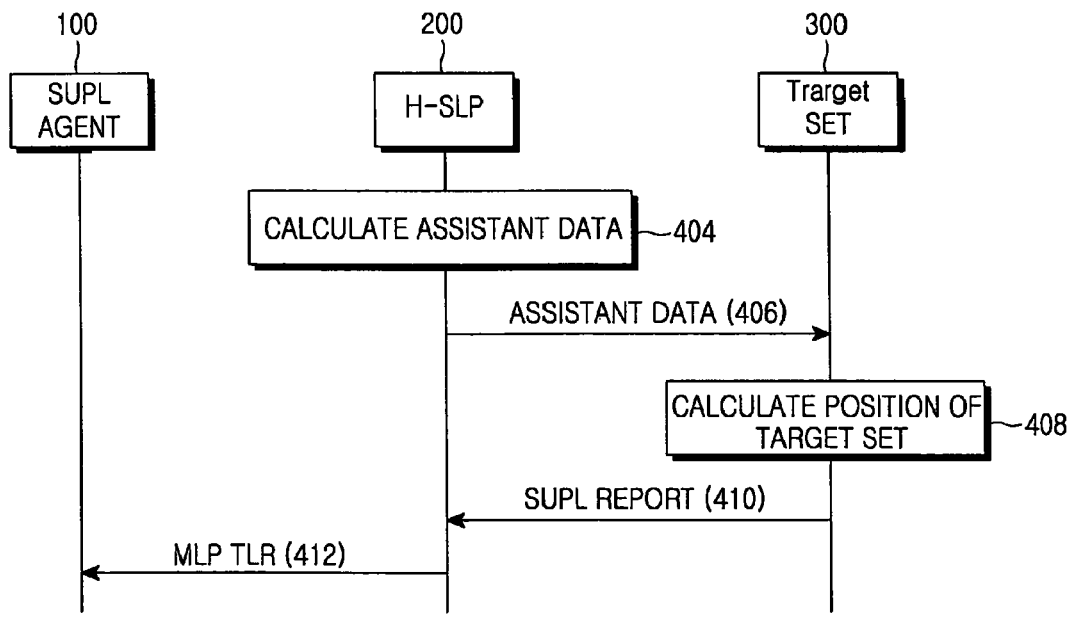
FIG. 4 is a flow diagram illustrating a stay warm session process when the SUPL agent requests a location service according to the present invention.

FIG. 4 is a flow diagram illustrating the stay warm session process when the SUPL agent 100 requests a location service according to the present invention. Referring to FIG. 4, the H-SLP 200 calculates assistant data in step 404 and transmits the calculated assistant data to the target SET 300 in step 406. The target SET 300 calculates a position thereof using the assistant data received from the H-SLP 200 in step 408 and transmits an SUPL REPORT message including the calculated position to the H-SLP 200 in step 410. The H-SLP 200 transmits an MLP PLR message including the position of the target SET 300, which is received from the target SET 300, to the SUPL agent 100 in step 412.

Figure 5:
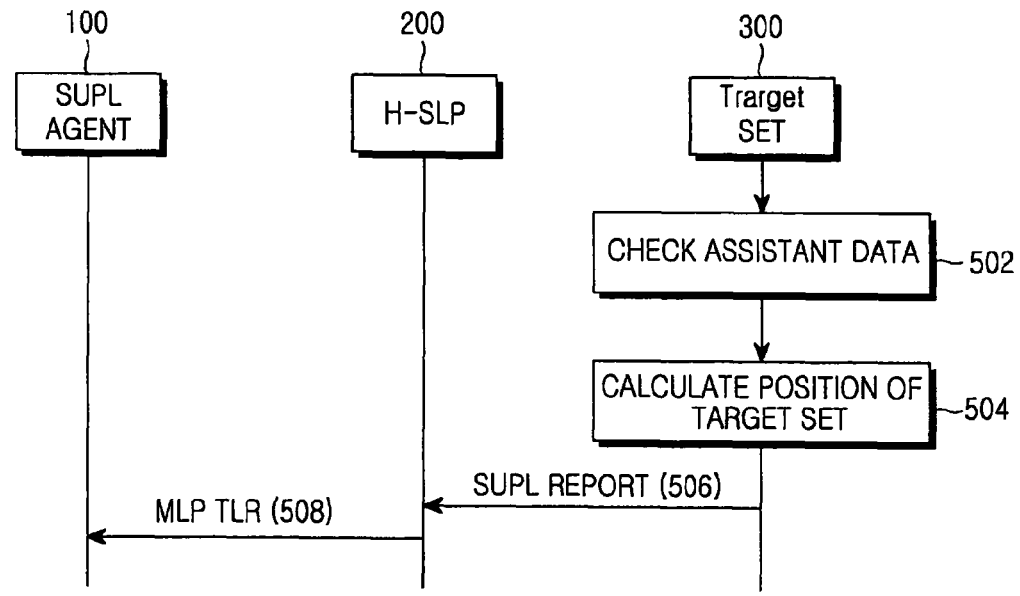
FIG. 5 is a flow diagram illustrating a case where a target SET performs a location calculation process when the SUPL agent requests a location service according to the present invention.

FIG. 5 is a flow diagram illustrating a case (i.e., the just calculation process), where the target SET 300 performs the location calculation process when the SUPL agent 100 requests a location service according to the present invention. Referring to FIG. 5, the target SET 300 checks in step 502 whether valid assistant data exists. If valid assistant data exists, the target SET 300 calculates a position thereof in step 504 and transmits an SUPL REPORT message including the calculated position to the H-SLP 200 in step 506. The H-SLP 200 transmits an MLP PLR message including the position of the target SET 300, which is received from the target SET 300, to the SUPL agent 100 in step 508.

Figure 6:
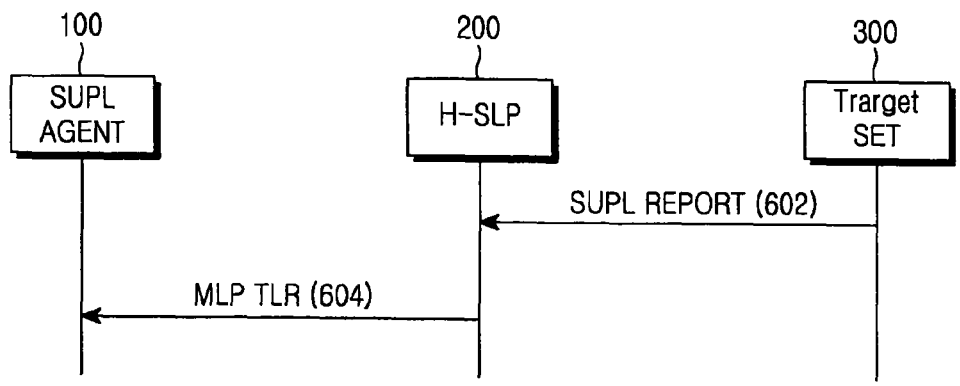
FIG. 6 is a flow diagram illustrating a case where a previous position of the target SET is used when the SUPL agent requests a location service according to the present invention.

FIG. 6 is a flow diagram illustrating a case, i.e., the SUPL report process (use a previous position), where a previous position of the target SET 300 is used when the SUPL agent 100 requests a location service according to the present invention. Referring to FIG. 6, the target SET 300 transmits an SUPL REPORT message including the previous position of the target SET 300 to the H-SLP 200 in step 602. The H-SLP 200 transmits an MLP PLR message including the previous position of the target SET 300, which is received from the target SET 300, to the SUPL agent 100 in step 604.

Figure 7:
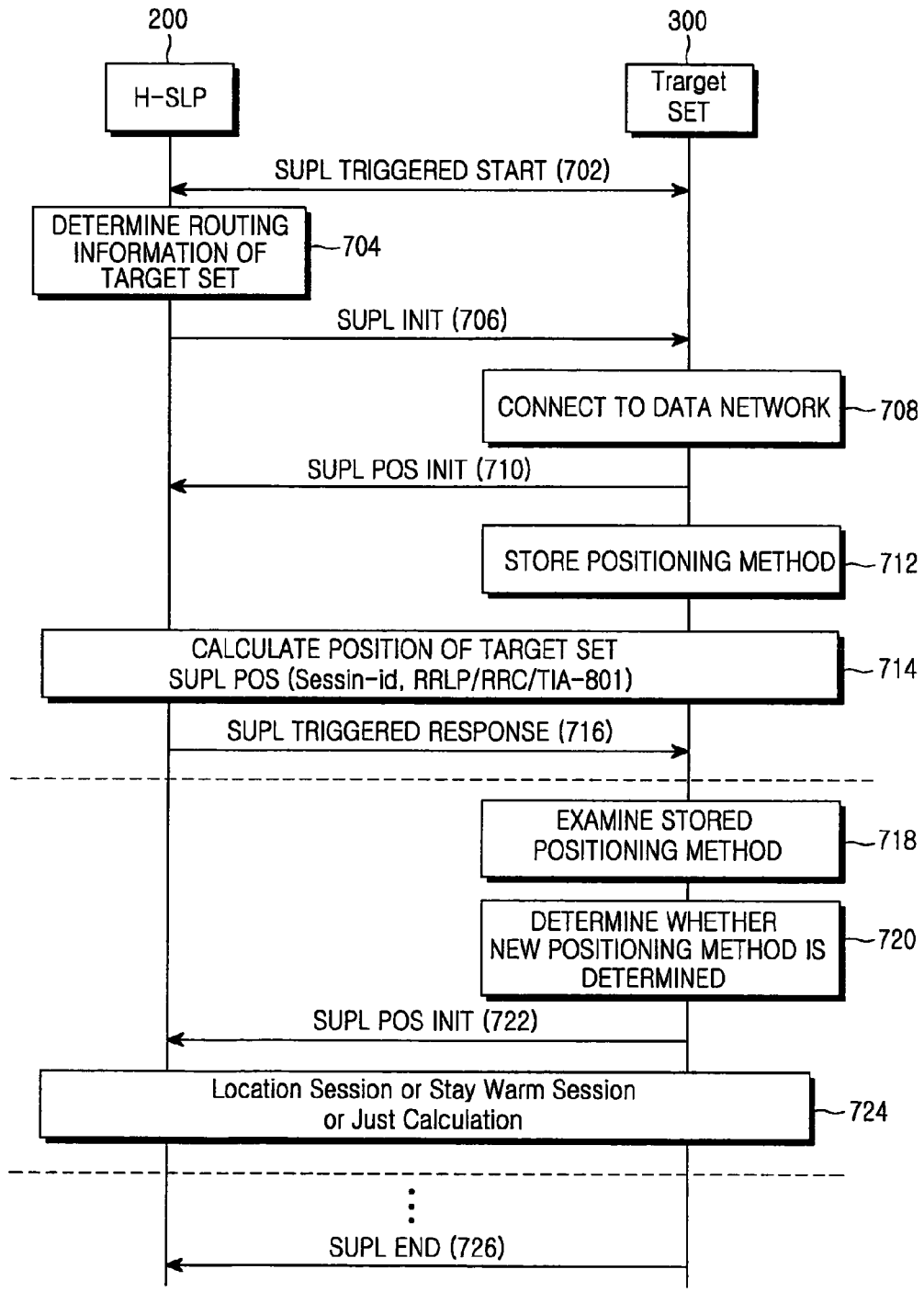
FIG. 7 is a flow diagram illustrating a location service providing method when a target SET requests a location service according to the present invention.

FIG. 7 is a flow diagram illustrating a method of providing a location service when the target SET 300 requests a location service according to the present invention. Referring to FIG. 7, the target SET 300 requests the H-SLP 200 for the periodic triggered location service using an SUPL TRIGGERED START message in step 702. In this case, the target SET 300 can request a desired location service by inserting a service-flag into the SUPL TRIGGERED START message, and in order to request the periodic triggered location service, the target SET 300 sets the service-flag to a value corresponding to a periodic triggered location service request.

If the SUPL TRIGGERED START message is received from the target SET 300, the H-SLP 200 determines which location service is requested by referring to the service-flag included in the SUPL TRIGGERED START message and sets up routing information of the target SET 300 in step 704. That is, the H-SLP 200 determines whether the target SET 300 is in a roaming state and whether the target SET 300 uses SUPL and sets up routing information according to the determination result. For the sake of clarity, it is assumed that the target SET 300 is in a non-roaming state and uses SUPL.

After the determination, the H-SLP 200 notifies the target SET 300 of the beginning of the periodic triggered location service by transmitting an SUPL INIT message to the target SET 300 in step 706. In this case, the service-flag and a trigger-flag are included in the SUPL INIT message. The service-flag indicates which type of location service was requested by the SUPL agent 100, and the trigger-flag indicates whether a trigger for beginning the location calculation process or the assistant data calculation process is generated by the H-SLP 200 or the target SET 300. In the present invention, since it is assumed that the periodic triggered location service is requested, a value of the service-flag is 20 according to Table 1, and since it is assumed that a trigger is generated by the target SET 300, a value of the trigger-flag is 1 according to Table 2.

When the SUPL INIT message is received, the target SET 300 tries a data network connection in step 708. That is, the target SET 300 determines whether it is connected to a packet data network, and if the target SET 300 is not connected to the packet data network, the target SET 300 attempts to connect to the packet data network. In this case, the target SET 300 determines the proxy mode or the non-proxy mode by referring to a SLP_MODE parameter included in the received SUPL INIT message. In the proxy mode, the target SET 300 is connected to the H-SLP 200 using IP.

After connected to the H-SLP 200 using IP, the target SET 300 transmits an SUPL POS INIT message to the H-SLP 200 in step 710. The SUPL POS INIT message includes a SET_CAPABILITY field. The SET_CAPABILITY field indicates which one of the MS-assisted A-GPS method and the MS-BASED A-GPS method is used as a positioning method and which one of the RRLP, the RRC protocol, and the IS-801 protocol is used as a positioning protocol.

If the SUPL POS INIT message is received from the target SET 300, the H-SLP 200 compares a value of the SET_CAPABILITY field to its own positioning capability and determines a positioning method used for the location calculation process according to the comparison result. The H-SLP 200 transmits the determined positioning method to the target SET 300.

The target SET 300 stores the positioning method in step 712. The target SET 300 and the H-SLP 200 calculate a position of the target SET 300 (SUPL POS) in step 714 using the positioning method stored in the target SET 300.

Since the target SET 300 sets the trigger-flag included in the SUPL TRIGGERED START message to 1, the target SET 300 detects the beginning of the periodic triggered location service and repeatedly checks a trigger generation time according to a trigger generation period. If it is determined that it is the trigger generation time, the target SET 300 generates a trigger to start the location calculation process or the assistant data calculation process.

To generate the trigger, the target SET 300 examines in step 718 whether a positioning method determined and stored at an initially connected time exists. The target SET 300 determines in step 720 whether a positioning method is re-determined. That is, the target SET 300 determines whether the stored positioning method is used or a new positioning method is determined. If an error was generated while the stored positioning method was being stored, or if the stored positioning method is inappropriate, the target SET 300 determines that a new positioning method is determined.

Based on the results of this determination, the target SET 300 notifies H-SLP 200 whether a previously determined positioning method is used or a new positioning method is determined by setting a value of a positioning method field (posmethod) included in an SUPL POS INIT message to 0 or null in step 722.

If the previously determined positioning method is included in the SUPL POS INIT message received from the target SET 300, the H-SLP 200 uses the previously determined positioning method. If a value of a positioning method field (posmethod) included in the SUPL POS INIT message received from the target SET 300 is 0 or null to determine a new positioning method, the H-SLP 200 re-determines a positioning method by performing the initial positioning method determination process again.

After a positioning method is determined, the H-SLP 200 and the target SET 300 calculate a position of the target SET 300 by performing a location session process, a stay warm session process, or a just calculation process in step 724.

As previously described, the location session process is a process for the H-SLP 200 to create assistant data and calculate the position of the target SET 300. The stay warm session process is a process in which the H-SLP 200 creates assistant data and transmits the created assistant data to the target SET 300 and the target SET 300 calculates a position thereof and uses the calculated position. The just calculation process is a process for the target SET 300 to check whether valid assistant data exists and, if valid assistant data exists, calculate a position thereof and use the calculated position.

The target SET 300 repeatedly checks the trigger generation time according to the trigger generation period defined by itself or the H-SLP 200, and iteratively performs steps 718 to 724 until a predetermined stop time lapses. If the predetermined stop time lapses, the target SET 300 notifies the H-SLP 200 that the periodic triggered location service ends by transmitting an SUPL END message to the H-SLP 200 in step 726.

Accordingly, resources used for the periodic triggered location service and all prepared resources are released, and the periodic triggered location service ends.

Though a case where the H-SLP 200 does not use a previous position of the target SET 300 has not been fully described, the H-SLP 200 may reuse the previous position of the target SET 300. In this case, steps 718 to 724 illustrated in FIG. 7 may be omitted, and the target SET 300 uses a previous position stored therein or receives a previous position from the SUPL agent 100.

In detail, if the previous position of the target SET 300 is used, the H-SLP 200 examines whether the previous position of the target SET 300 is stored in a memory thereof. If the previous position of the target SET 300 is stored in the memory, the H-SLP 200 determines whether QoP of the previous position of the target SET 300 is appropriate to a level of QoP required by the target SET 300. If it is determined that the QoP of the previous position of the target SET 300 is appropriate, the H-SLP 200 directly transmits the previous position to the target SET 300.

If the target SET 300 also has a previous position stored therein or receives a previous position from the H-SLP 200 through an SUPL RESPONSE message, the target SET 300 determines whether the previous position is used. That is, the target SET 300 compares QoP of the previous position to desired QoP, and if the QoP of the previous position is higher than the desired QoP, the target SET 300 accepts that the previous position is reused. If the target SET 300 simultaneously has the previous position stored therein and the previous position received from the H-SLP 200, the target SET 300 selects a previous position having higher QoP by comparing the previous position stored therein to the previous position received from the H-SLP 200 and compares QoP of the selected previous position to the desired QoP, if the QoP of the selected previous position is higher than the desired QoP, the target SET 300 accepts that the selected previous position is reused.

The location service providing method corresponding to the case where the target SET 300 requests a location service according to the present invention is illustrated in Table 4.

TABLE 4

| A case where target SET requests a location service (SET initiated case) | | |
|---|---|---|
| SET assisted case | Location session | H-SLP calculates assistant data, calculates position of target SET, and transmits calculated position to target SET. |
| SET based case | Stay warm session | H-SLP calculates assistant data, and target SET receives calculated assistant data, calculates its position, and uses calculated position. |
| — | Just calculation | Target SET has valid assistant data, calculates its position using valid assistant data, and uses calculated position. |
| — | SUPL report (use a previous position) | Target SET has previous position, and if QoP of previous position is appropriate to desired level, target SET uses previous position. |

The location session process, the stay warm session process, the just calculation process, and the SUPL report process (use a previous position) of the case where the SUPL agent 100 requests a location service, i.e., the network initiated case, which are illustrated in Table 4, will now be described in detail.

Figure 8:
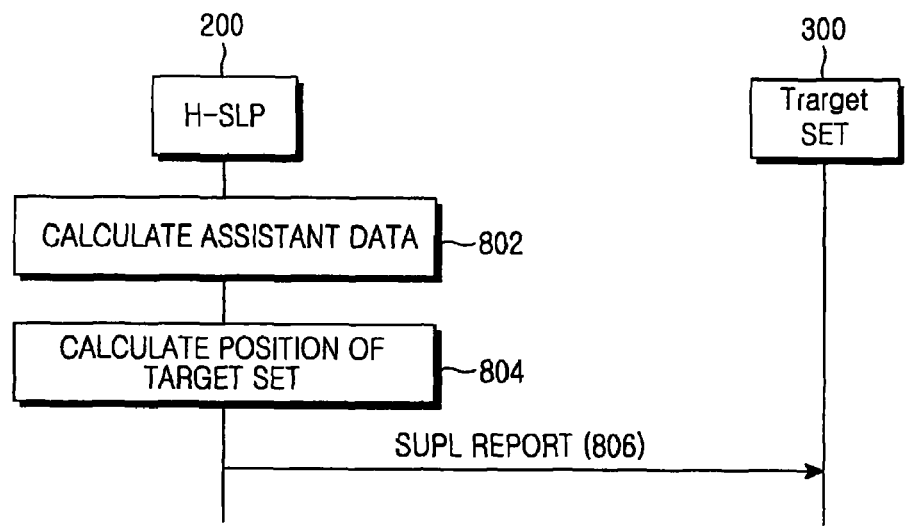
FIG. 8 is a flow diagram illustrating a location session process when the target SET requests a location service according to the present invention.

FIG. 8 is a flow diagram illustrating the location session process when the target SET 100 requests a location service according to the present invention. Referring to FIG. 8, the H-SLP 200 calculates assistant data in step 802, calculates a position of the target SET 300 using the calculated assistant data in step 804, and transmits an SUPL REPORT message including the calculated position of the target SET 300 to the target SET 300 in step 806.

Figure 9:
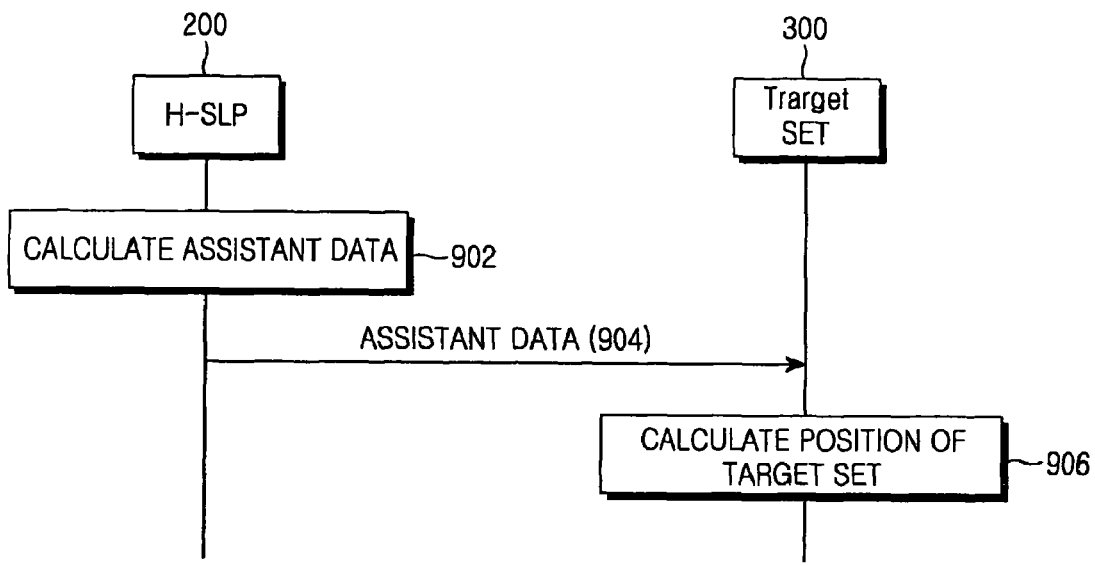
FIG. 9 is a flow diagram illustrating a stay warm session process when the target SET requests a location service according to the present invention.

FIG. 9 is a flow diagram illustrating the stay warm session process when the target SET 300 requests a location service according to the present invention. Referring to FIG. 9, the H-SLP 200 calculates assistant data in step 902 and transmits the calculated assistant data to the target SET 300 in step 904. The target SET 300 calculates a position thereof using the assistant data received from the H-SLP 200 and uses the calculated position in step 906.

Figure 10:
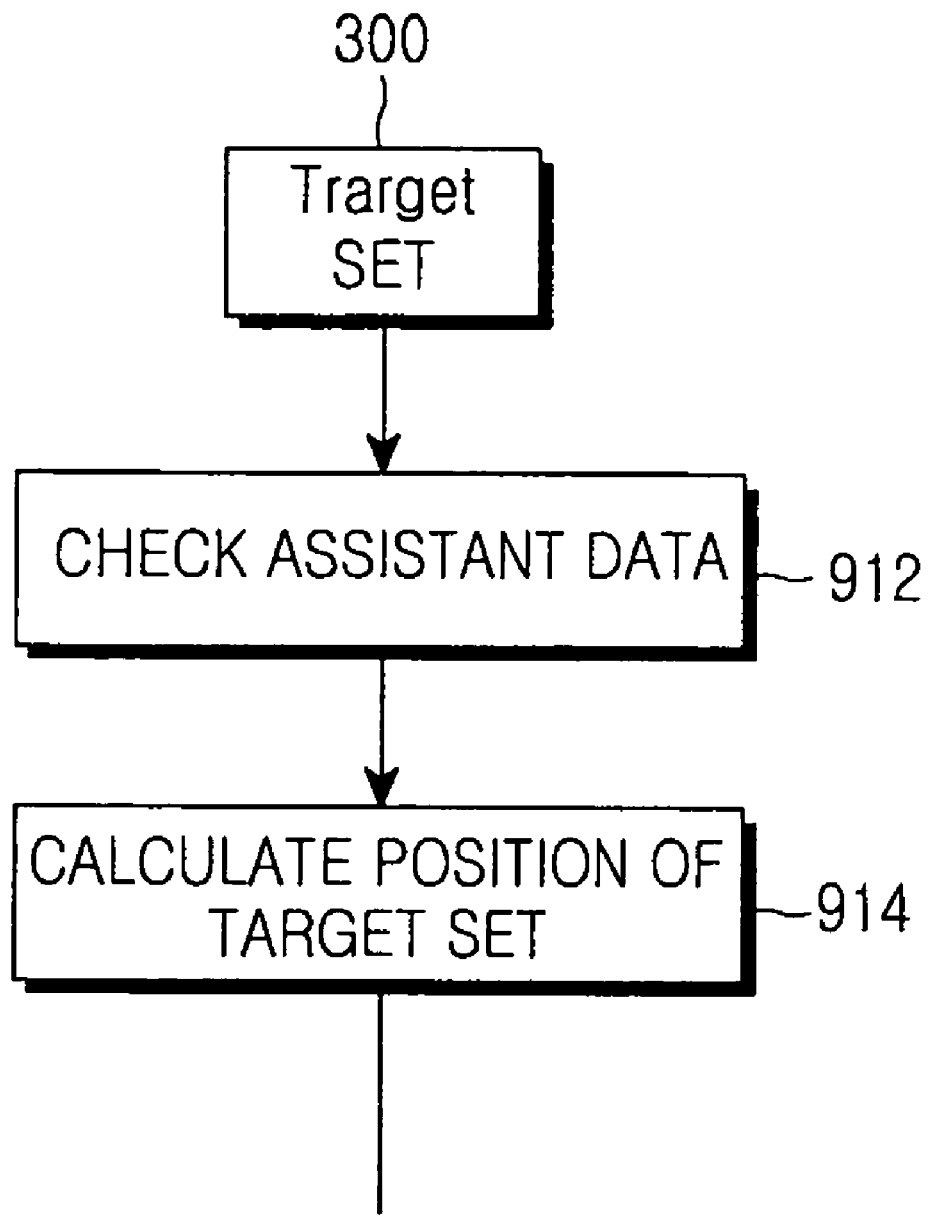
FIG. 10 is a flowchart illustrating a case where a previous position is reused when the target SET requests a location service according to the present invention.

FIG. 10 is a flowchart illustrating a case, i.e., the just calculation process, where a previous position is reused when the target SET 300 requests a location service according to the present invention. Referring to FIG. 10, the target SET 300 checks in step 912 whether valid assistant data exists. If valid assistant data exists, the target SET 300 calculates and uses a position thereof in step 914.

The SUPL report process (use a previous position) will now be described. If the H-SLP 200 has a previous position of the target SET 300, and if QoP of the previous position is appropriate to QoP required by the target SET 300, the H-SLP 200 determines that the previous position is reused and transmits the previous position to the target SET 300. If the target SET 300 has a previous position, and if QoP of the previous position is appropriate to desired QoP, the target SET 300 reuses the previous position. In this case, a connection process is not performed with the H-SLP 200. That is, the target SET 300 neither requests assistant data from the H-SLP 200 nor performs the location calculation process with the H-SLP 200.

As described above, according to the present invention, in a triggered location service, by storing a positioning method in a target SET and transmitting the stored positioning method to an H-SPL, the H-SPL can reuse the positioning method without determining a new positioning method, thereby preventing loss of variable data in a positioning method and an overload problem of the H-SPL.

In addition, by using the positioning method stored in the target SET in a location calculation process, the number of executions of a positioning method determination process can be reduced.

In addition, if the positioning method stored in the target SET has an error or is not appropriate in the location calculation process, a new positioning method is determined.

In addition, by detecting using a service-flag which service type is requested by an SUPL agent, billing corresponding to the requested service type and privacy checking can be properly performed.

In addition, by notifying of a trigger generation initiated party using a trigger-flag, the trigger generation initiated party according to a situation can be easily detected.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A location service providing system comprising:
  a target SUPL (Secure User Plane for Location) Enabled Terminal (SET) for:
  storing a positioning method determined in an initialization stage of a location service according to a location service request, wherein the positioning method is one of a Mobile Station (MS)-assisted Assisted Global Positioning System (A-GPS) method and an MS-based A-GPS method;
  determining in a location calculation process whether the stored positioning method is available, when the target SET receives a new location service request, after storing the positioning method in the initialization stage;
  providing the stored positioning method to a Home-SUPL Location Platform (H-SLP), if it is determined that the stored positioning method is available; and
  requesting for re-determination of a positioning method to the H-SLP, if it is determined that the stored positioning method is unavailable.

2. The system of claim 1, wherein if the stored positioning method is available, the target SET transmits a positioning initialization (SUPL POS INIT) message including a value corresponding to the stored positioning method to the H-SLP, and if the stored positioning method is unavailable, the target SET transmits the SUPL POS INIT message including a value for requesting re-determination of the positioning method to the H-SLP.

3. The system of claim 1, wherein an SUPL agent requests the location service.

4. The system of claim 3, wherein the SUPL agent requests the location service using a service-flag indicating a location service type.

5. The system of claim 4, wherein the location service comprises at least one of an immediate location service, a triggered location service, an emergency location service, and a lawful location service.

6. The system of claim 1, wherein the target SET and the H-SLP use a trigger-flag to indicate whether a party notifying of the beginning of the location calculation process is the target SET or the H-SLP.

7. The system of claim 1, wherein the target SET and the H-SLP:
  perform the location calculation process using at least one of a location session process, a stay warm session process, and a just calculation process; and
  provide the location service according to the calculated position,
  wherein during the location session process, the H-SLP creates assistant data and calculates a position of the target SET,
  wherein during the stay warm session process, the H-SLP creates assistant data and transmits the created assistant data to the target SET, and the target SET calculates its position using the assistant data, and
  wherein during the just calculation process, the target SET checks whether valid assistant data exists and, if valid assistant data exists, calculates its position using the valid assistant data.

8. A method for providing a location service in a target Secure User Plane for Location (SUPL) Enabled Terminal (SET), the method comprising:
  storing, by the target SET, a positioning method determined in an initialization stage of a location service according to a location service request, wherein the positioning method is one of a Mobile Station (MS)-assisted Assisted Global Positioning System (A-GPS) method and an MS-based A-GPS method;
  determining in a location calculation process whether the stored positioning method is available, when the target SET receives a new location service request;
  providing the stored positioning method to a Home-SUPL Location Platform (H-SLP), if it is determined that the stored positioning method is available; and requesting re-determination of a positioning method from the H-SLP, if it is determined that the stored positioning method is unavailable.

9. The method of claim 8, wherein if the stored positioning method is available, the target SET transmits a positioning initialization (SUPL POS INIT) message including a value corresponding to the stored positioning method to the H-SLP, and if the stored positioning method is unavailable, the target SET transmits the SUPL POS INIT message including a value for requesting re-determination of the positioning method to the H-SLP.

10. The method of claim 8, further comprising requesting, by an SUPL agent, the location service.

11. The method of claim 10, wherein the step of requesting the location service comprises:
setting a value of a service-flag indicating a location service type to be requested; and
transmitting a message including the set service-flag to the H-SLP.

12. The method of claim 10, wherein the location service comprises at least one of an immediate location service, a triggered location service, an emergency location service, and a lawful location service.

13. The method of claim 8, wherein the target SET and the H-SLP use a trigger-flag to indicate whether a party notifying of the beginning of the location calculation process is the target SET or the H-SLP.

14. The method of claim 8, further comprising:
performing the location calculation process using one of a location session process, a stay warm session process, and a just calculation process; and
providing the location service according to the calculated position,
wherein during the location session process, the H-SLP creates assistant data and calculates a position of the target SET,
wherein during the stay warm session process, the H-SLP creates assistant data and transmits the created assistant data to the target SET, and the target SET calculates its position using the assistant data, and
wherein during the just calculation process, the target SET checks whether valid assistant data exists and, if valid assistant data exists, calculates its position using the valid assistant data.

15. A location service providing system comprising:
a Home-Secure User Plane for Location (SUPL) Location Platform (H-SLP) for providing the location service using a stored positioning method, if the stored positioning method is provided from a target SUPL Enabled Terminal (SET), when the target SET receives a new location service request, receiving a re-determination request of the positioning method from the target SET, re-determining a new positioning method of the target SET, and providing the location service by using the new positioning method,
wherein the stored positioning method is determined in an initialization stage of the location service according to a previous location service request, and the positioning method is one of a Mobile Station (MS)-assisted Assisted Global Positioning System (A-GPS) method and an MS-based A-GPS method.

16. The system of claim 15, wherein an SUPL agent generates the location service request.

17. The system of claim 16, wherein the location service request includes a service-flag indicating a location service type.

18. The system of claim 17, wherein the location service type comprises at least one of:
an immediate location service;
a triggered location service;
an emergency location service; and
a lawful location service.

19. The system of claim 15, wherein the target SET and the H-SLP use a trigger-flag to indicate whether a party notifying a beginning of a location calculation process is the target SET or the H-SLP.

20. The system of claim 15, wherein the target SET and the H-SLP:
perform a location calculation process using at least one of a location session process, a stay warm session process, and a just calculation process; and
provide the location service according to a calculated position from the location calculation process,
wherein during the location session process, the H-SLP creates assistant data and calculates a position of the target SET,
wherein during the stay warm session process, the H-SLP creates assistant data and transmits the created assistant data to the target SET, and the target SET calculates its position using the assistant data, and
wherein during the just calculation process, the target SET checks whether valid assistant data exists and, if valid assistant data exists, calculates its position using the valid assistant data.

21. A method for providing a location service in Home-Secure User Plane for Location (SUPL) Location Platform (H-SLP), the method comprising:
providing the location service using a stored positioning method, if the stored positioning method is provided from a target SUPL Enabled Terminal (SET), when the target SET receives a new location service request;
receiving a re-determination request of the positioning method from the target SET;
re-determining a new positioning method of the target SET; and
providing the location service by using the new positioning method,
wherein the stored positioning method is determined in an initialization stage of the location service according to a previous location service request, and the positioning method is one of a Mobile Station (MS)-assisted Assisted Global Positioning System (A-GPS) method and an MS-based A-GPS method.

22. The method of claim 21, wherein an SUPL agent generates the location service request.

23. The method of claim 22, wherein the SUPL agent generates the location service request by setting a value of a service-flag indicating a location service type to be requested, and transmitting a message including the set service-flag to the H-SLP.

24. The method of claim 23, wherein the location service includes at least one of an immediate location service, a triggered location service, an emergency location service, and a lawful location service.

25. The method of claim 21, wherein the target SET and the H-SLP use a trigger-flag to indicate whether a party notifying a beginning of a location calculation process is the target SET or the H-SLP.

26. The method of claim 21, further comprising:

determining whether a previous position exists;

if a previous position exists, performing a location calculation process using the previous position, without using the stored positioning method or a re-determined positioning method; and providing the location service according to a calculated position from the location calculation process.

27. The method of claim 21, wherein providing the location service comprises:

performing a location calculation process using one of a location session process, a stay warm session process, and a just calculation process; and providing the location service according to a calculated position from the location calculation process, wherein during the location session process, the H-SLP creates assistant data and calculates a position of the target SET, wherein during the stay warm session process, the H-S LP creates assistant data and transmits the created assistant data to the target SET, and the target SET calculates its position using the assistant data, and wherein during the just calculation process, the target SET checks whether valid assistant data exists and, if valid assistant data exists, calculates its position using the valid assistant data.

\* \* \* \* \*